(12) United States Patent
Arad et al.

(10) Patent No.: US 7,668,107 B2
(45) Date of Patent: Feb. 23, 2010

(54) HARDWARE IMPLEMENTATION OF NETWORK TESTING AND PERFORMANCE MONITORING IN A NETWORK DEVICE

(75) Inventors: Nir Arad, Nesher (IL); Tsahi Daniel, Tel-Aviv (IL); Maxim Mondaeev, Givat-Ella (IL)

(73) Assignee: Marvell Israel (M.I.S.L.) Ltd. (IL)

( * ) Notice: Subject to any disclaimer, the term of this patent is extended or adjusted under 35 U.S.C. 154(b) by 548 days.

(21) Appl. No.: 11/387,549

(22) Filed: Mar. 22, 2006

(65) Prior Publication Data

US 2007/0223388 A1    Sep. 27, 2007

(51) Int. Cl.
*H04J 1/16* (2006.01)
(52) U.S. Cl. .......... 370/242
(58) Field of Classification Search .......... None
See application file for complete search history.

(56) References Cited

U.S. PATENT DOCUMENTS 6,658,480 B2 * 12/2003 Boucher et al. .......... 709/239
7,411,957 B2 * 8/2008 Stacy et al. .......... 370/392
2006/0002292 A1 * 1/2006 Chang et al. .......... 370/225
2006/0002386 A1 * 1/2006 Yik et al. .......... 370/389

OTHER PUBLICATIONS

Mohan, Dinesh, Nortel Networks, "802.1ag—Connectivity Fault management Tutorial—Part 1" (Jul. 12, 2004) pp. 1-21.
Katz, D. and Ward, D., "Bidirectional Forwarding Detection" The Internet Society (© 2004), pp. 1-40.

* cited by examiner

*Primary Examiner*—Frank Duong

(57) ABSTRACT

An embodiment of the present invention offloads the generation and monitoring of test packets from a Central processing Unit (CPU) to a dedicated network integrated circuit, such as a router, bridge or switch chip associated with the CPU. The CPU may download test routines and test data to the network IC, which then generates the test packets, identifies and handles received test packets, collects test statistics, and performs other test functions all without loading the CPU. The CPU may be notified when certain events occur, such as when throughput or jitter thresholds for the network are exceeded.

16 Claims, 12 Drawing Sheets

HARDWARE IMPLEMENTATION OF NETWORK TESTING AND PERFORMANCE MONITORING IN A NETWORK DEVICE

FIELD OF THE INVENTION

The present invention generally relates to the testing of computer networks, and, in particular, to the generation and monitoring of test traffic.

BACKGROUND OF THE INVENTION

As networks evolve and transmission speeds grow, the requirements for network testing tools change as well. There are a variety of technologies available to address the assessment of network performance, as well as the troubleshooting of network problems and the pin-pointing of root causes. Testing products may be classified according to numerous criteria. For example, tools may be directed to the laboratory, for an implemented network, or both. There are software tools, stand alone equipment, simulation tools, and so on.

Such testing tools can provide a range of functions. For example, tools may send different types of packets on a round trip through a network, and examine aspects on their return. Timestamps and sequence numbers are used to determine delay and jitter, among other issues. Such tools may assess whether certain paths between devices are congested or not functional, and the reasons for the problem. Tools may be directed at monitoring remote nodes. The performance of certain networks and devices may be assessed. Quality of Service (QoS) and Service Level Agreements (SLAs) may be monitored. With the growth of Metro Ethernet traffic, network reliability becomes more important as real-time interactive applications (e.g., voice, multimedia) gain a larger share of the market.

There are, however, certain limitations with various tools. For example, there is a very wide range of software tools that may be used on network devices (e.g., routers or switches). However, software based solutions may face a variety of challenges in testing next generation networks. Because they are implemented in software, they may have serious limitations in providing line rate testing at Gigabit speeds. Such solutions may create test traffic congestion and slow processing of other functions performed by the CPU of the network device. Also, there may be inaccurate measurements because of the processing delays (e.g., due to certain buffers, queing, etc.) inherent in a software based tool. Such latency can increase failure response times, and this issue is of increasing relevance because service providers want millisecond resilience in Metropolitan Area Network (MAN) environments.

There is also a range of stand alone equipment and devices that can be attached to or otherwise coupled with the network, or the network devices, to be tested. However, such test equipment can be costly. Moreover, there are space issues to contend with, as well as additional issues related to measurement accuracy. There is, thus, a need in the art for more integrated testing tools that can provide measurement speed and accuracy to meet with today's evolving needs.

BRIEF SUMMARY OF THE INVENTION

An embodiment of the present invention offloads the generation and monitoring of test packets from the CPU to a dedicated network integrated circuit, such as a router, bridge or switch chip associated with the CPU. The CPU may download test routines and test data to the network IC, which then generates the test packets, identifies and handles received test packets, collects test statistics, and performs other test functions all without loading the CPU. The CPU may be notified when certain events occur, such as when throughput or jitter thresholds for the network are exceeded.

According to various embodiments of the invention, methods are described for generating and monitoring test packets from a single integrated circuit. In some embodiments, a method of generating payload data for a plurality of test packets to be transmitted by an integrated circuit is described. A set of data is planted in buffer allocated to supplying the payload of a test packet. The planted set of data is read from a buffer for use as payload data in a first test packet, and the planted set of data is read from the buffer for use as payload data in a second test packet. A plurality of data packets received by the integrated circuit are processed to determine forwarding information for the plurality of data packets. The first test packet, the second test packet, and one or more data packets of the plurality are transmitted out of the integrated circuit directed to a network.

In some embodiments, a received data packet is identified as an incoming test packet, and the first test packet is generated in response to the incoming test packet. The second test packet may also be generated in response to the incoming test packet. The planted set of data does not comprise the payload of the incoming test packet.

In various embodiments, a response packet is received which comprises information from the first test packet and additional information from a node which the first test packet passed through in the network. The information from the response packet is stored in the integrated circuit. According to some embodiments, a first timestamp is appended to the first test packet before it is transmitted out of the integrated circuit, and a second timestamp is associated with the response packet after it is received at the integrated circuit, wherein the response packet includes information comprising the first timestamp. The additional information from the node may include the timestamp.

In some embodiments, a set of buffers may be allocated as the buffers to be read from in generating payload for each test packet, and a set of data may be planted in a subset of the buffers. A plurality of additional test packets may be generated, each with payload read from the subset of buffers. The plurality of additional test packets may have different sequence numbers, and be transmitted out of the integrated circuit. A plurality of additional response packets may be received which are generated external to the integrated circuit, and in response to the plurality of additional test packets which were transmitted out of the integrated circuit. Jitter and packet loss may be measured based on the plurality of additional response packets received.

In some embodiments of the invention, the set of data is randomized after it is read from the buffer, for use as payload data in a third test packet. The set of data may be otherwise modified after it is read from the buffer, for use as payload data in a fourth test packet. In certain embodiments, a set of data may be planted in the buffer via instructions executed by a Central Processing Unit (CPU), wherein each other step is executed without load on the CPU. Test and response packets may comprise a frame from a protocol selected from the group consisting of Internet Protocol, Medium Access Control, Internet Control Message Protocol, Real-Time Transport Protocol, Transmission Control Protocol, and User Datagram Protocol. In some embodiments, the plurality of data packets received each comprise a header. An apparatus may be configured to carry out the above methods. The apparatus, in some embodiments, comprises one or more of the following: an ingress port, an egress port, a test packet monitor, a forwarding engine, a test packet generator, a control unit, and a transmit unit. The apparatus may comprise a single integrated circuit.

In a variety of embodiments of the invention, a method of receiving a test packet at a network device is described. A header of each of a plurality of data packets received at a network device is parsed. A subset of headers are filtered based on identification as test packet headers. Information from each filtered header is stored. Unfiltered headers are processed to determine forwarding information for data packets associated with the unfiltered headers. The method of receiving the test packet may further include releasing buffers storing payload data from each filtered header.

In some embodiments, a test packet is transmitted from the network device directed at a network, and one or more of the filtered headers comprise headers of response packets triggered by the test packet at a node in the network. In certain embodiments, a test packet is generated in response to one or more filtered headers. In other embodiments, a plurality of test packets are generated in response to a filtered header, triggered by the identification of the filtered header as a test packet header. Each test packet of the plurality may comprise a different timestamp and different sequence number. In some embodiments, a first timestamp is associated with filtered header after entry to the network device, and an egress timestamp is appended to a response packet triggered by the filtered header, wherein the response packet includes information comprising the first timestamp. In various embodiments, a communication path associated with one or more of the filtered headers is monitored, and a failure notification is sent when information stored from one or more of the filtered headers indicates failure on the communication path. An apparatus may be configured to carry out the above methods. The apparatus, in some embodiments, comprises one or more of the following: an ingress port, an egress port, a test packet monitor, a forwarding engine, a test packet generator, a control unit, and a transmit unit. The apparatus may comprise a single integrated circuit.

In certain embodiments, code for generating payload data for a plurality of test packets to be transmitted by an integrated circuit is described. There is code for reading a set from a buffer for use as payload data in a first test packet, and code for reading the set of data from the buffer for use as payload data in a second test packet. There is code for processing a plurality of data packets received by the integrated circuit, to determine forwarding information for the plurality of data packets. There is code to transmit the first test packet, the second test packet, and one or more data packets of the plurality out of the integrated circuit directed to a network. In other embodiments, there is additional code to accomplish the respective steps.

In various embodiments of the invention, there is code for receiving a test packet at a network device. There is code to parse a header of each of a plurality of data packets received at a network device. There is code to filter subset of headers based on identification as test packet headers, and code to store information from each filtered header. There is also code to process unfiltered headers to determine forwarding information for data packets associated with the unfiltered headers. In other embodiments, there is additional code to accomplish the respective steps.

In certain embodiments, means for generating payload data for a plurality of test packets to be transmitted by an integrated circuit are described. There are means for reading a set from a buffer for use as payload data in a first test packet, and means for reading the set of data from the buffer for use as payload data in a second test packet. There are means for processing a plurality of data packets received by the integrated circuit, to determine forwarding information for the plurality of data packets. There are means to transmit the first test packet, the second test packet, and one or more data packets of the plurality out of the integrated circuit directed to a network. In other embodiments, there are additional means to accomplish the respective steps.

In various embodiments of the invention, there are means for receiving a test packet at a network device. There are means to parse a header of each of a plurality of data packets received at a network device. There are means to filter a subset of headers based on identification as test packet headers, and means to store information from each filtered header. There are also means to process unfiltered headers to determine forwarding information for data packets associated with the unfiltered headers. In other embodiments, there are additional means to accomplish the respective steps.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following may be components of a larger system, wherein other procedures may take precedence over or otherwise modify their application. Also, a number of steps may be required before, after, or concurrently with the following embodiments.

I. Overview

A method and apparatus for hardware based generation of test packets is described. A set of data is read from a buffer for use as payload data in a first test packet and a second test packet. A plurality of other data packets received by the integrated circuit are processed to determine their forwarding information. The first test packet, the second test packet, and one or more of the data packets are transmitted out of the integrated circuit. A method and apparatus for hardware based monitoring of test packets are also described. A header of each of a plurality of data packets received at a network device is parsed. A subset of the headers are filtered, based on their identification as test packet headers, and information from each filtered header is stored. Unfiltered headers are processed to determine forwarding information for data packets associated with the unfiltered headers.

II. Exemplary Device Structure and Functionality

Figure 1:
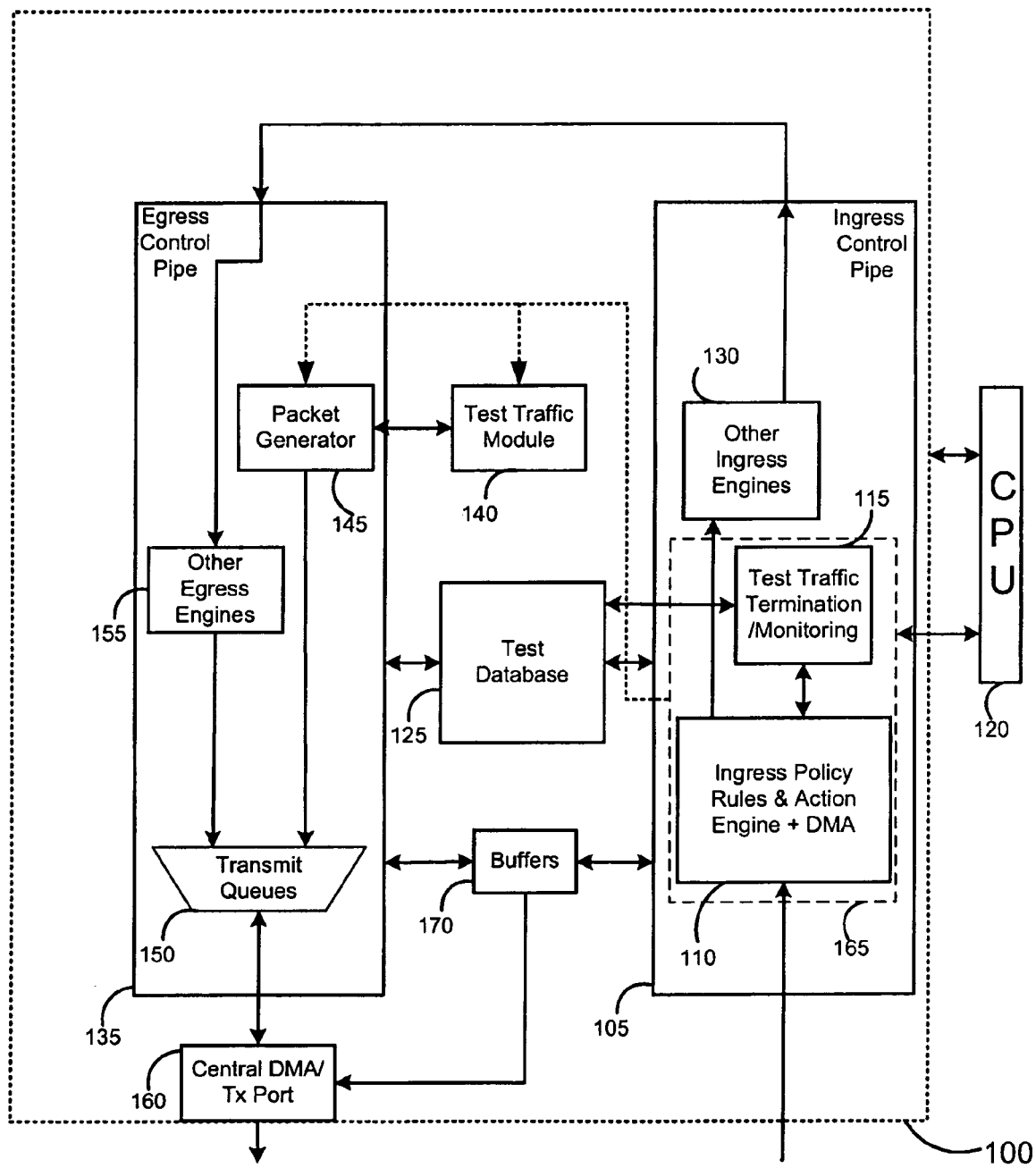
FIG. 1 is a simplified block diagram illustrating an apparatus and its components providing functionality according to various embodiments of the present invention.

A. Device Structure: FIG. 1 illustrates an exemplary device structure according to various embodiments of the invention. The exemplary device 100 comprises a single Application Specific Integrated Circuit (ASIC). In some embodiments, the ASIC is designed using a hardware description language (HDL), such as Very High Speed Integrated Circuit Hardware Description Language (VHDL) or Verilog, to synthesize and map functions to logic gates in the ASIC. In other embodiments, other types of integrated circuits may be used (e.g., Structured/Platform ASICs, Field Programmable Gate Arrays (FPGAs) and other Semi-Custom ICs), which may be programmed in any manner known in the art. For example, System-on-Chip (SoC) microprocessing has developed rapidly, and a variety of chip fabrication techniques are known in the art to allow more functions to be included on a single chip. It is also well known in the art to design general processors to accomplish equivalent functions.

In various exemplary embodiments of the invention, a processing pipeline on the device 100 performs processing operations on a received packet. The processing pipeline includes an Ingress Control Pipe 105, and an Egress Control Pipe 135. Components of the processing pipeline process and modify a received test or response packet, and generate test or response packets as well. In various embodiments, components of the processing pipeline also lookup forwarding information for non-test traffic, and forward the non-test traffic according to the lookup. In some embodiments, therefore, components of the pipeline filter the test and response packets, and then process the other data traffic. In this way, an ASIC may act as a bridge, switch or router which forwards data traffic, while also generating and monitoring test and response traffic. The chip includes a number of memories, which in the present embodiments are designated as the Test Database 125, Test Traffic Module 140, and Buffers 170. As used herein, "test packets" and "response packets" may be deemed to be packets created according to embodiments of the invention.

As a packet is received by the device, it enters the Ingress Control Pipe 105, and is processed by the Ingress Policy Rules and Action Engine+DMA 110 (hereinafter "Ingress Policy Rules and Action Engine," or "Engine"). In various embodiments, this Engine 110 is also responsible for packet reception, allocation of Buffers 170 in the device's packet memory, control of the Direct Memory Access (DMA) system, and DMA of the packet (or portion thereof) into Buffers 170 memory. The DMA system can control certain memories on the ASIC without using the CPU. The DMA system moves data from one memory location or region to another memory location or region. Thus, it can efficiently write certain portions of a received packet to one or more buffers while forwarding information for a packet is determined. While it is limited in the type of transfers it can accomplish, there are many situations where automated memory access is faster than using the CPU to manage the transfers. Also, a CPU 120 can transmit data into the Ingress Control Pipe 105 to provide the payload for generated test or response packets. The DMA can plant data provided by the CPU to Buffers 170 allocated for test and response packet generation. Therefore, when discussion related to data planted by the CPU 120, it shall be understood that this data may be planted by the DMA. Also, while this embodiment includes a DMA unit, in other embodiments different types of memory access units (as known in the art) may plant the data in the allocated buffer.

The Ingress Policy Rules and Action Engine 110 parses the packet header, and examines the fields of the header. Engine 110 includes a policy filter (e.g., a policy Ternary Content Addressable Memory ("TCAM")), which is used to identify test packets or response packets (through examination of the parsed header). In certain embodiments, such filtering takes place at the top of the policy list for the Engine 110. In other embodiments, there may be a dedicated TCAM to check a parsed header for test or response packets, and to forward other headers to a more traditional Ingress Policy Rules and Action Engine. A TCAM is a form of content addressable memory (CAM) which are often used as a hardware search engines, and are typically much faster than algorithmic approaches for search-intensive applications. CAMs are composed of conventional semiconductor memory (usually SRAM) with added comparison circuitry.

Identification of a test packet (or response packet) may trigger the Packet Generator 145 to generate a response with the information extracted (packet generation will be discussed in detail below). There is also a Test Traffic Termination/Monitoring Component 115 which may be configured to accumulate statistics and information for storage in a Test Database 125, or elsewhere. The Test Traffic Termination/Monitoring Component 115 may also notify the CPU 120 if certain actions are required. For example, the Test Traffic Termination/Monitoring Component 115 may be configured to identify when a monitored communication path is not performing to specified standards, or if a path has failed.

The Engine 110 and Test Traffic Termination/Monitoring component 115 may be configured to function separately.

Alternatively, the functions of both components may be performed using different configurations. The term "Test Packet Monitor" will be used when referring to the functionality both components, and reference numeral 165 indicates the combination of components. Those skilled in the art will recognize the various configurations available. Regardless of the particular configuration, the Test Packet Monitor 165 identifies the test or response packet, and forwards (or initiates the forwarding of) non-test traffic to the Other Ingress Engines 130 (e.g., Forwarding Engine, Policy Engine, etc). The Test Packet Monitor 165 is configured to be able to discard (or otherwise terminate) identified test traffic (e.g., once it triggers packet generation and the relevant header information is stored). In this manner the test or response packet header may be filtered before being processed by the Other Ingress Engines 130, thereby releasing the buffers 170 allocated to the test or response packet.

Figure 2:
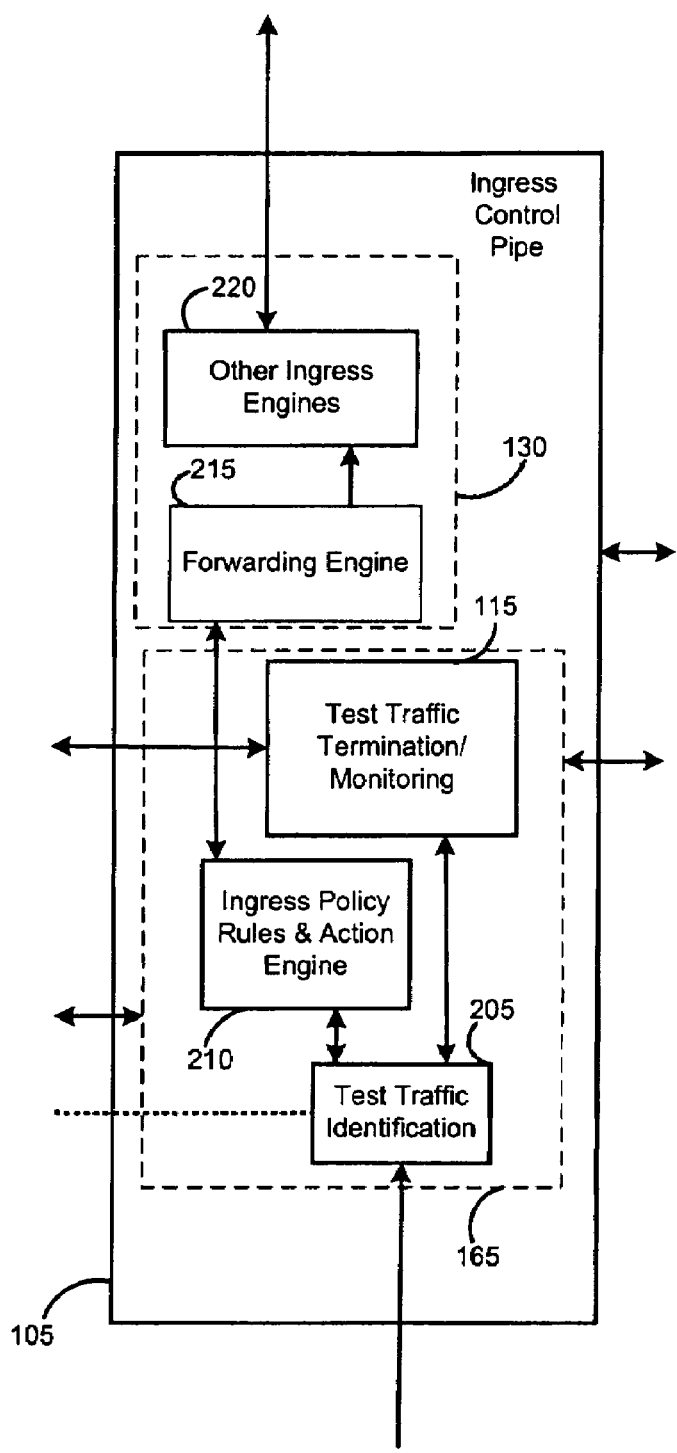
FIG. 2 is a simplified high-level block diagram illustrating the ingress control pipe functionality according to various embodiments of the present invention.

FIG. 2 illustrates an alternative configuration 200 of the ingress pipeline 105 according to an alternative embodiment of the invention. In this embodiment, the configuration of the Test Packet Monitor 165 is different. There is a Test Traffic Identification engine 205 comprising a dedicated TCAM to determine if a parsed header is a test or response packet header. If a test or response packet is identified, the header is filtered and processed by the Test Traffic Termination/Monitoring Component 115 in the manner described above. Otherwise, the unfiltered header is processed by a Ingress Policy Rules and Action Engine 210 (without the test traffic identification functionality). Depending on the header and applicable rules, a header is then processed by a Forwarding Engine 215. The Forwarding Engine 215 may include, for example, a Bridge Engine, or any other lookup mechanism known in the art. The Forwarding Engine 215 processes the parsed header to determine whether a packet should be forwarded, and if so, through what egress ports and in what form. The Forwarding Engine 215 may have a packet dropped, or the header may be processed by Remaining Ingress Engines 220.

Returning to FIG. 1, in various embodiments different test traffic "flows" may be monitored separately with the Test Packet Monitor 165. In one embodiment, 32 channels are supported. Thus, a packet descriptor associated with a channel may be marked as such with an appropriate channel ID. Each monitored channel can be linked to a corresponding packet generator channel. Receipt and identification of a test packet by the Test Packet Monitor 165 may trigger the packet generator immediately, or after a predefined number of test or response packets are received.

The integrated circuit may be coupled with one or more CPUs 120 (such as, for example, a 64-Bit MIPS processing core). The CPU 120 executes a sequence of stored instructions, and may be configured to control many functions of the underlying device. A CPU 120 may handle the central processing chores for the device, including on-chip layer 1 through layer 3 cache, interfaces to off-chip L2 or L3 cache, integer pipelines, virtual memory management, and interfaces to system resources such as DRAM, PCI bus, flash memory, etc. However, a number of the test functions of the present invention are being off loaded from the CPU 120, an issue that will be addressed in detail throughout. The CPU 120 may, however, retain some processing duties related to testing. By way of example, the Test Traffic Termination/Monitoring component 115 may notify the CPU 120 if certain traffic parameters are observed, and the CPU 120 may be configured to execute failover or QoS instructions. Also, the CPU 120 may trigger (or initiate) the Packet Generator 145. In some embodiments it plants data in an allocated Buffer 170 (i.e., allocated to test and response packet generation on a temporary or permanent basis), and the planted data is read by the Packet Generator 145 (e.g., through the Central DMA 160) in generating traffic. However, it is worth noting that the actual generation of the traffic (reading the allocated buffer, and adding or modifying the header) is accomplished by the Packet Generator 145, without any load on the CPU.

Turning to the Packet Generator 145, the generated traffic may be classified as response packets (or response traffic) and test packets (or test traffic). Response traffic is generated when received test traffic, identified by the Test Packet Monitor 165, triggers response generation. An identified flow may be linked one to one with the Packet Generator 145 which, as stated above, can be done on a per channel basis. The test information contained in header fields of the identified test packet may be extracted and passed to the header fields in the response traffic generated by the Packet Generator 145, along with the relevant accumulated traffic statistics. For filtered traffic, the Test Database 125 holds the monitored data per channel. The received monitored packet is terminated at Test Traffic Termination/Monitoring 115, and the Buffer 170 holding the payload of the terminated packet is released in order not to consume resources required for other traffic. This information may be placed in Test Traffic Module 140 after reception or identification, and read by the Packet Generator 145 when generating a response. In this way, received test traffic may be filtered to trigger the Packet Generator 145 to produce response, or test, packets.

Test traffic (as opposed to response traffic) may be self triggered by the Packet Generator 145, triggered by Test Packet Monitor 165, or initiated by the CPU 120. The generated test traffic may be continuous, a burst of packets, or a single packet. The generated packet's byte size may be constant, or may be random or variable in size (with, or without, a specified range). The Packet Generator generates test traffic, with payload read from a Buffer 170. There may be any number of buffers allocated (temporarily, or permanently) to test packet and response packet generation. In some embodiments, data is planted by the CPU 120 in an allocated packet buffer 170. In still other embodiments, the data may be planted by other components. The Packet Generator 145 then uses the allocated packet buffer 170 as payload for the test or response packet. The planted packet data may be read any number of times. The Packet Generator 145 may alter (expand, or contract) the size of the planted data generated packet. In some embodiments, the Central DMA/TxPort 160 reads the buffer 170 and extracts information from a descriptor generated by the Packet Generator 145 to create the test (or response) packet.

The Packet Generator 145 may generate test traffic for any number of channels. In one embodiment, there are 32 channels, with each channel configured and operating independently from the others. Each Packet Generator 145 channel is associated with a target device port. The Packet Generator 145 may inject packet identifiers (Timestamp, Sequence Number, etc.) into the headers. The foregoing discussion illustrates how test packets and response packets may be generated, without load on the CPU 120.

Turning back to the other packets (i.e., non-test and non-response), their headers are not filtered, and thus they may be processed by the other Ingress Engines 130. They may then be directed to the Egress Control Pipe 135, and out through the Other Egress Engines 155 (e.g., Egress Filtering Unit, Layer 2 Multicast Replication Unit, Header Alteration Unit, etc.). The "other" packets may be merged with the test and response packets generated by the Packet Generator 145, and placed in Transmit Queues 150 for transmission via the Tx Port 160.

B. Device Processing Flow: An improved understanding of aspects of the invention may be achieved with a closer examination of an exemplary processing flow of FIG. 1. The device 100 may receive test, or response, packets, as well as other data traffic. As a packet is received by the device, it enters the Ingress Control Pipe 105. The packet (or a subset thereof, such as header information) may be placed in allocated buffers 170 memory. The Ingress Policy Rules and Action Engine 110 identifies a response or test packet. A component of the Test Packet Monitor 165 (e.g., the Rules and Action Engine, or the Traffic Termination/Monitoring Component) triggers the Packet Generator 145 when certain test traffic is identified.

Information comprising test statistics are gathered by the Test Traffic Termination/Monitoring Component 115, and stored in the Test Database 125. The Test Database 125 may also be in communication with various components of each Control Pipe. Based on certain defined parameters, the CPU 120 is alerted by the Test Traffic Termination/Monitoring Component 115 in certain circumstances. For example, a service level measurement directed at packet loss, jitter, rate, or other characteristics can result in the CPU 120 being notified. A CPU 120 may be configured to modify a forwarding database if certain paths fail to meet performance criteria. A component of the Test Packet Monitor 165 forwards other (non-test and non-response) traffic to the Other Ingress Engines 130 (e.g., Forwarding Engine, Policy Engine, Bridge Engine, etc). Such other traffic may then be processed through the remainder of the Ingress Control Pipe 105, and the Egress Control Pipe 155.

Turning to the Packet Generator 145, response traffic is generated when received test traffic, which has been identified by a policy component within the Test Packet Monitor 165, triggers response generation. This information may be placed in the Test Traffic Module 140 upon reception or identification, and read by the Packet Generator 145 when generating a response. Generated test or response packet descriptors are created by the Packet Generator, and are placed in Transmit Queues 150. The payload of test traffic and response traffic is generated from data read from an allocated buffer 170. Planted data may be read any number of times. As noted above, the data may be planted by the CPU to an allocated buffer 170. In addition to reading the payload data from the allocated buffer 170, the Central DMA/TX Port may read the relevant header fields from a descriptor generated by the Packet Generator 145, and the test or response packet may be transmitted out of the device 100 through a port 160. With this high level overview of various embodiments of the invention completed, there will now be a closer examination of certain elements.

The following three sections, 1) C Packet Generation, 2) D. Test Packet Reception and Response, and 3) E. Test Packet Reception at Originating Device, together illustrate how a embodiments of the invention can function together. C. Packet Generation illustrates the packet generation capabilities of various claimed embodiments of the invention. D. Test Packet Reception and Response illustrates how a second device may receive and respond to a packet generated as described in C. Packet Generation. E. Test Packet Reception at Originating Device describes how the originating device may receive a response packet. Although these examples illustrate how different devices may work together, each of the described embodiments may function independently, as well. In order to better illustrate how different components on each device work together, various processing or data paths are highlighted in bold.

Figure 3:
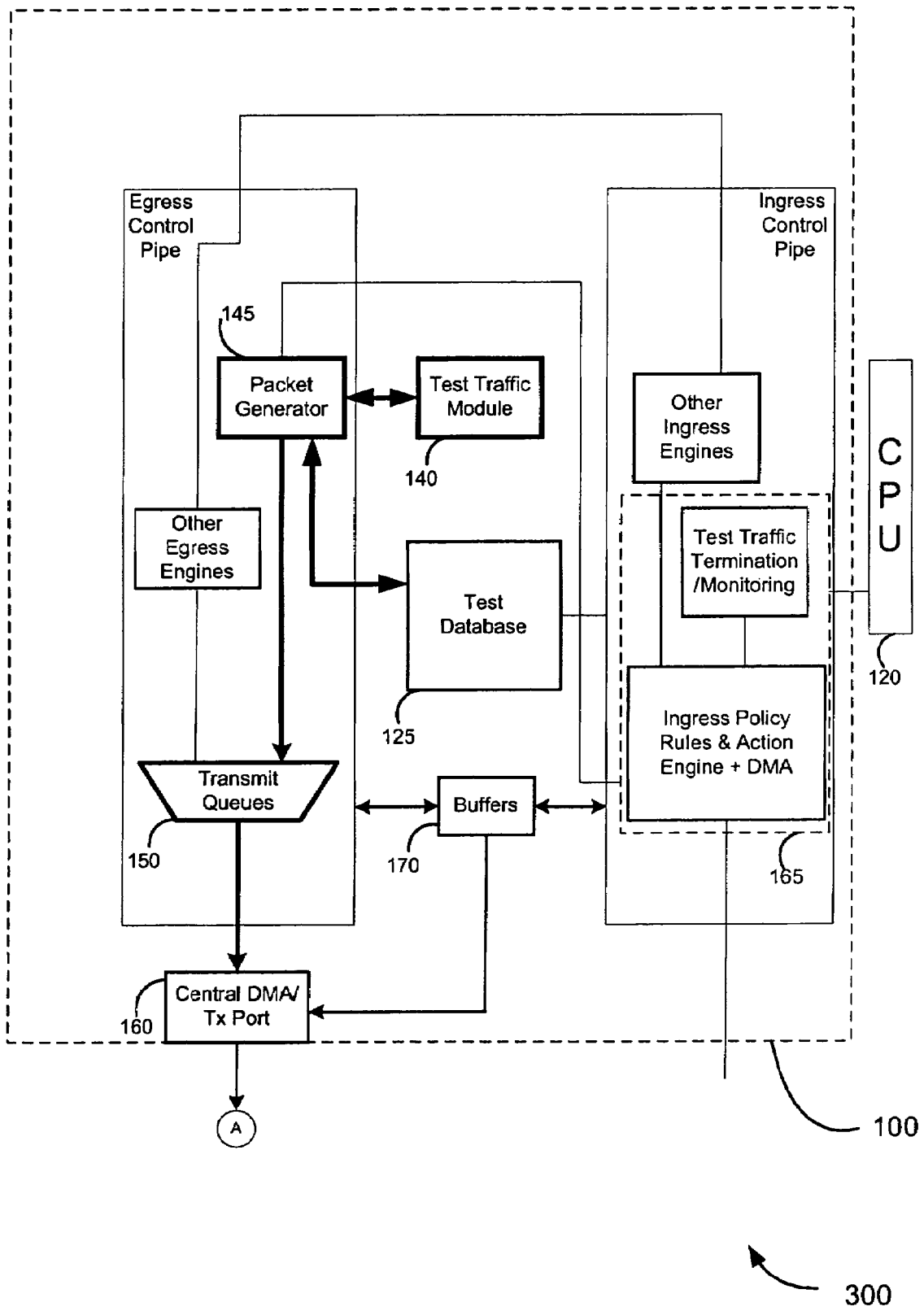
FIG. 3 is a simplified block diagram illustrating the packet generation functionality of an apparatus according to various embodiments of the present invention.

C. Packet Generation: As noted above, generated test traffic from the Packet Generator may be self triggered by the Packet Generator 145, triggered by Test Packet Monitor 165, or initiated by the CPU 120. FIG. 3 illustrates a simplified block diagram 300, highlighting the packet generation capabilities of an integrated circuit 100 functioning in accordance with various exemplary embodiments of the invention. Test, and response, packets may comprise any data packets created according to the various embodiments of the invention for purposes of network testing, monitoring, or assessment. Various protocols may be used, and embodiments of the invention can be used in a system, or on a stand alone basis.

As discussed, "generating" test or response packets may comprise reading, or otherwise replicating or modifying, data planted in an allocated buffer, and then adding a header to that data, to thereby create the test or response packets. A Central DMA/TxPort 160 for the device 100 may append the header (e.g., from a generated descriptor) to the planted data read from the buffer 170 and, thus, may be considered a component of the Packet Generator 145 in some embodiments.

For purposes of this discussion, data may be "planted" in an allocated buffer 170 by a CPU 120 or the Packet Generator 145, or some other component may plant the data in other embodiments. The planted data may then be read (e.g., by the Central DMA/TxPort 160) and used as the payload for a test or response packet. As noted, each set of planted data may be used one or more times, and may be used by more than one channel. The Packet Generator 145 may randomize the planted data, or otherwise alter the size of the data read from an allocated buffer.

Generated test or response data may, but need not necessarily, include any combination of the following information in the header: target interface, target device, target port, a CRC, packet size mode (fixed or random), packet size, packet range, traffic class, packet type or protocol, a "test" or "response" indicator, channel information, sequence number, timestamp, generated packet count, payload type, length, source port, VLAN-IDs, priority indicators, and any other tags or identifier than may be used for testing, monitoring, assessment, etc. This information may be read from the Test Traffic Module 140, the Test Database 125, or via any other manner known in the art. This information may be generated by the Packet Generator 145 in the form of a descriptor for the test or response packet. It is worth noting that the payload of a response packet need not comprise the payload of the triggering test packet.

Merely by way of example, one type of packet that may be used in various embodiments of the invention is an Internet Control Message Protocol (ICMP) packet. In some embodiments, each channel of the Packet Generator may be configured with one of the following configurations:

Channel Traffic Type Field:
    ICMP Request—Modify the <Sequence Number> field and Data[15:0] with each generated packet for this channel.
    ICMP Echo—Modify <Sequence Number>, and <Identifier>, fields (also the Data[15:0]).
    ICMP Timestamp Request—Modify the <Sequence Number>, <Originate Timestamp>, and <Checksum> fields.
    ICMP Timestamp Reply—Modify the <Sequence Number>, <Originate Timestamp>, <Receive Timestamp>, <Transmit Timestamp>, and <Checksum> fields.

However, in various other embodiments, other protocols may be generated, such as Internet Protocol (IP), Medium Access Control (MAC), Real-Time Transport Protocol (RTP), Transmission Control Protocol (TCP), or User Datagram Protocol (UDP). For example, in some embodiments, each channel of the Packet Generator may be configured with one of the following configurations:

RTP/UDP—Modify the <Sequence Number> and <Timestamp> fields.

RTP/UDP Echo—Modify the <Sequence Number>, <Timestamp>, <Receive Timestamp>, <Received packet count> and <Received Out of Sequence packets>.

Other protocols, beyond those addressed above, may be used as well. The above discussion is intended to be exemplary in nature, and is intended to illustrate embodiments of the invention that are only exemplary in nature. Turning back to FIG. 3, the generated packets may be forwarded from the Packet Generator 145, and merged with the other egress traffic on the device 100. The merged traffic may then be forwarded to the Transmit Queues 150, and transmitted out of a port 160 of the device 100.

Figure 4:
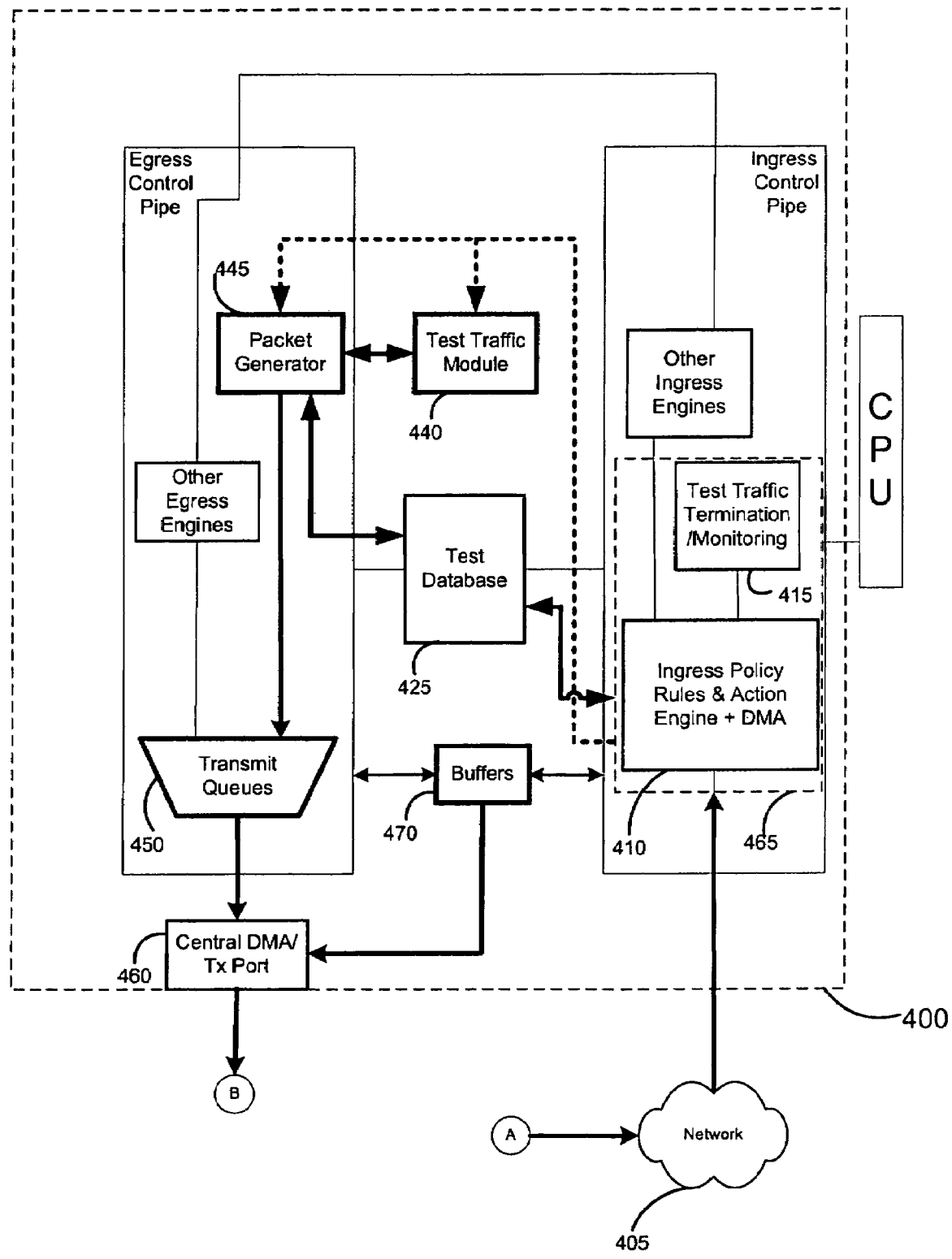
FIG. 4 is a simplified block diagram illustrating the packet reception and response functionality of an apparatus according to various embodiments of the present invention.

D. Test Packet Reception and Response: Turning now to FIG. 4, this figure illustrates a simplified block diagram, highlighting the packet reception and response capabilities of an integrated circuit 400 configured in accordance with various exemplary embodiments of the invention. For purposes of discussion, we will assume that an ICMP Timestamp Request packet was transmitted from the device 100 in FIG. 3, containing the <Sequence Number>, <Originate Timestamp>, and <Checksum> fields. This ICMP Timestamp Request packet is transmitted from the device 100 to a Network 405, such as the Internet or any other network upon which data is transmitted. From the Network 405, the second device 400 receives the ICMP Timestamp Request. The Ingress Policy Rules and Action Engine 410 (which, with a Test Traffic Termination/Monitoring 415 Component, may together comprise a Test Packet Monitor 465) identifies the packet as a test packet requiring a response. As noted above, an Ingress Policy Rules and Action Engine 410 may identify flows on a per channel basis. Each identified flow can be linked to the Packet Generator on a per channel basis, as well.

As described above, the functionality providing for the identification of test flows may be put at the top of a more generalized ingress policy engine, or a separate test flow identifier may be used. Regardless, once the ICMP Timestamp Request is identified, data from the packet (or subset thereof) may be stored in the Test Database 425 or Test Traffic Module 440, and otherwise dropped from the Ingress Control Pipeline. A component of the Test Packet Monitor 465 triggers the Packet Generator 445 to generate a response to the received packet. As illustrated, this functionality may occur without interaction or load on the CPU.

The Ingress Policy Rules and Action Engine 410 may be configured in any manner known in the art to identify test packets or other test flows to be monitored according to various embodiments of the invention. In some embodiments, the Ingress Policy Rules and Action Engine 410 may be specifically configured to receive packets of a predefined format to provide for expedited packet parsing and field extraction for measurement and response generation. For example, the Ingress Policy Rules and Action Engine 410 may be configured to filter the same types of traffic as generated by the Packet Generator of the first device 100. In some embodiments, a policy TCAM, as described above, may be configured to examine the header of a received packet to identify and filter test packets. The TCAM may be configured to do a very fast search of certain header fields (e.g., the test "Packet Identifier" field, as described below) in a received packet generated according to embodiments of the invention (e.g., such as the first device 100), to make the identification.

When a test or response packet is received, there is a variety of information that can be recorded. The Test Traffic Termination/Monitoring 415 Component of the Test Packet Monitor 465, may store the information in a Test Database 425 (or Test Traffic Module 440 if the information will be transmitted in response). Merely by way of example, the following information may be recorded, on a per channel basis:

Packet Sequence Number[15:0]—The monitored packet Sequence Number, for storage or copy to response.

Packet Identifier[15:0]—The monitored packet Identifier field (which may be a unique identifier to specify the specific flow, channel, transmitting Device, etc.), for storage or copy to response.

Packet Sender Timestamp[31:0]—The last received monitored packet Timestamp field, for storage or copy to response.

Packet Reply Receiver Timestamp[31:0]—Reply received packet Timestamp at the reply receiver.

Receive Timestamp[31:0]—The time base value of the monitored packet.

In various embodiments, any other combination of measurements related to sequence numbers, timestamps, or other testing data may be stored. Also, layer 2 echo may be configured for Bidirectional Failure Detection (BFD). IEEE 802.1ag connectivity fault management may also be supported. Given the capabilities of various embodiments of the invention, the BFD and 802.1ag configurations would be apparent to one skilled in the art.

Turning now to the Packet Generator 445 (which may also be referred to in some embodiments as the Test Packet Response Generator), we will assume that it has received the trigger from the Test Packet Monitor 465. To generate a response, the Packet Generator 445 may read the received test packet information from the Test Traffic Module 440. The Packet Generator 445 may create a packet header containing additional fields, or modifying existing fields.

By way of example, for the ICMP Timestamp Request received from the first Device 305, the <identifier> and <sequence number> fields may remain the same, while the timestamp messages may be modified in a variety of ways, as apparent to one skilled in the art. The originating timestamp could be kept in the response packet but placed in a new field, while an ingress and egress timestamp for the Device could be appended to the response packet as well. The Packet Generator 445 may communicate with the Test Database 425 or Test Traffic Module 440 to retrieve information regarding the manner in which response packets shall be generated. The information regarding how test packets should be generated, received, and responded to may be imbedded when the chip is fabricated, or the CPU can download and modify such information in the field. One skilled in the art will recognize the various configurations available.

The generated response packets may be forwarded from the Packet Generator 445 in the form of a descriptor, and merged with the other egress traffic on the device 400 and placed in Transmit Queues 450. The Central DMA/Tx Port 460 may read the payload data from the allocated Buffers 470, and transmit the response packet out of the Device.

Figure 5:
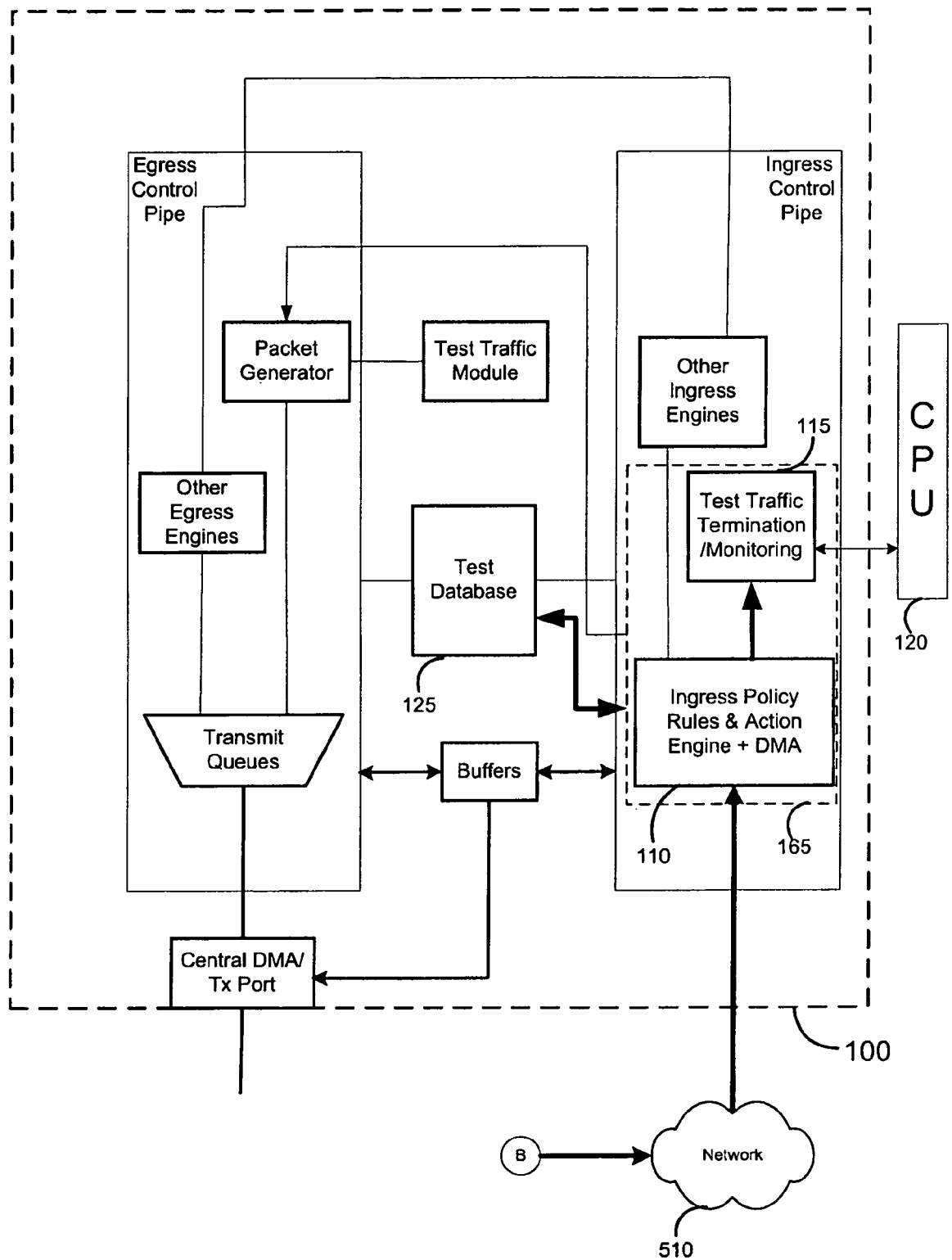
FIG. 5 is a simplified block diagram illustrating the response packet generation reception functionality of an apparatus according to various embodiments of the present invention.

E. Test Packet Reception at Originating Device: Turning now to FIG. 5, this figure illustrates a simplified block diagram, highlighting the response packet reception capabilities of the integrated circuit 100 of FIG. 3 functioning in accordance with various exemplary embodiments of the invention. For purposes of discussion, we will assume that a response to ICMP Timestamp Request packet transmitted from the first device 100 to the second device 400, is transmitted from the second device 400 to a Network 510, such as the Internet or any other network upon which data is transmitted. From the Network 510, the first device 100 receives the response packet.

An Ingress Policy Rules and Action Engine 110 identifies the packet as a response packet sent in response to a test packet transmitted from the device 100. Statistics contained in the header may be stored on a temporary or more permanent basis in the Test Database 125. The Test Traffic Termination/Monitoring Component 115 of the Test Packet Monitor 165 may receive and analyze these and other testing statistics in the Test Database 125 and compare them to certain defined performance benchmarks. The Test Packet Monitor 165 may, if performance falls below certain benchmarks, notify the CPU 120. Notably, however, the Test Packet Monitor 165 may undertake the storing of network performance statistics, and assessment of performance, without load on the CPU. The device 100 may be configured so that the CPU is called upon only when certain performance metric benchmarks are not met.

III. Exemplary Testing: Paths and Capabilities

A. Paths: FIGS. 6A-6D illustrate various examples of the paths that may be tested according to various embodiments of the invention. FIGS. 6A-6D illustrate exemplary embodiments in which a first Device 605 communicates with a second Device 610 to perform testing according to embodiments of the invention. The first Device 605 in each exemplary embodiment has a Test Packet Generator 615 and Test Packet Monitor 630, and the second Device 610 has a Test Packet Monitor 620 and Test Packet Response Generator 625 also. Note that in each of the embodiments, a "path" under test may pass through several network devices on the way to the target.

Figure 6A:
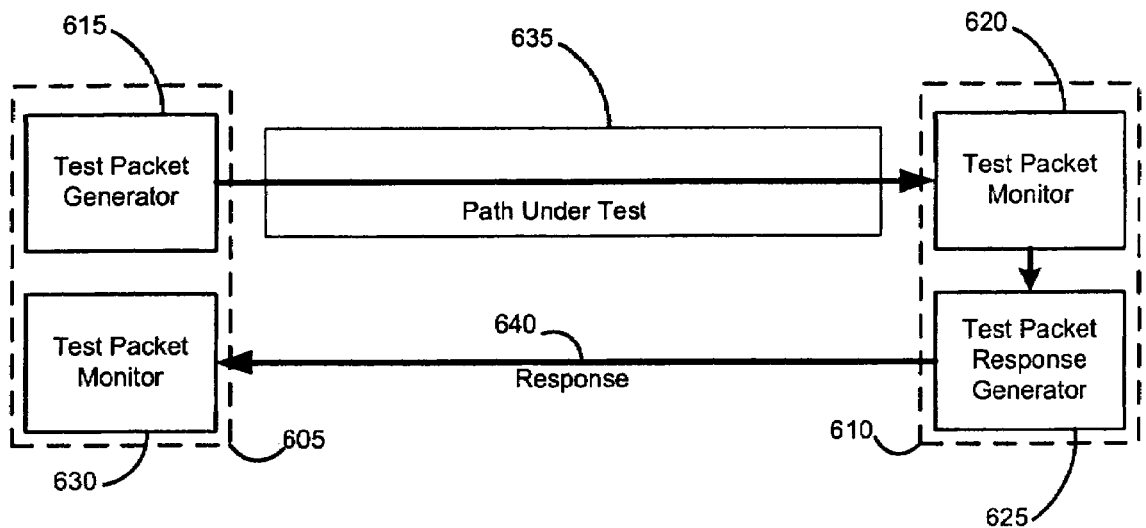
FIGS. 6A-6D are simplified block diagrams providing exemplary illustrations of path testing achieved according to various embodiments of the present invention.

In FIG. 6A, an exemplary block diagram 600A shows a case in which the path under test is from the first Device 605 to the second, remote Device 610. Generally, the Test Packet Generator 615 generates test traffic (e.g., timestamps, sequence numbers) and transmits them to target device 610. The Test Packet Monitor 620 may identify and monitor the test traffic, accumulating the path under test 635 statistics. The Test Packet Monitor 620 may trigger the response generation from the Test packet Response Generator 625, the response 640 containing the accumulated statistics or raw data copied from test traffic. The Test Packet Monitor 630 may intercept the response traffic 640 and accumulate the statistics on the path under test 635.

Figure 6B:
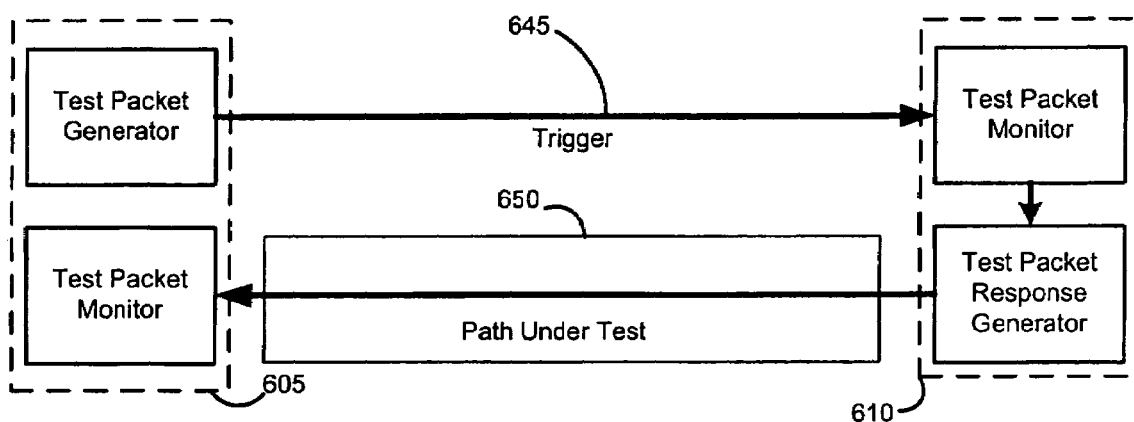

In FIG. 6B, an exemplary block diagram 600B shows a case in which the path under test is from the second Device 610 to the first, local Device 605. The Test Packet Generator at the first Device 605 may generate test packets (i.e., a trigger for remote generation of test traffic) indicating the type of packets to be sent. The information may be transmitted 645 to target device 610. The remote Test Packet Monitor may identify the test packets, and trigger response packet generation at the target Device 610, the response 650 comprising test traffic (e.g., new timestamps, sequence numbers). The local Test Packet Monitor may intercept the response traffic 640 and accumulate the statistics on the path under test 650.

Figure 6C:
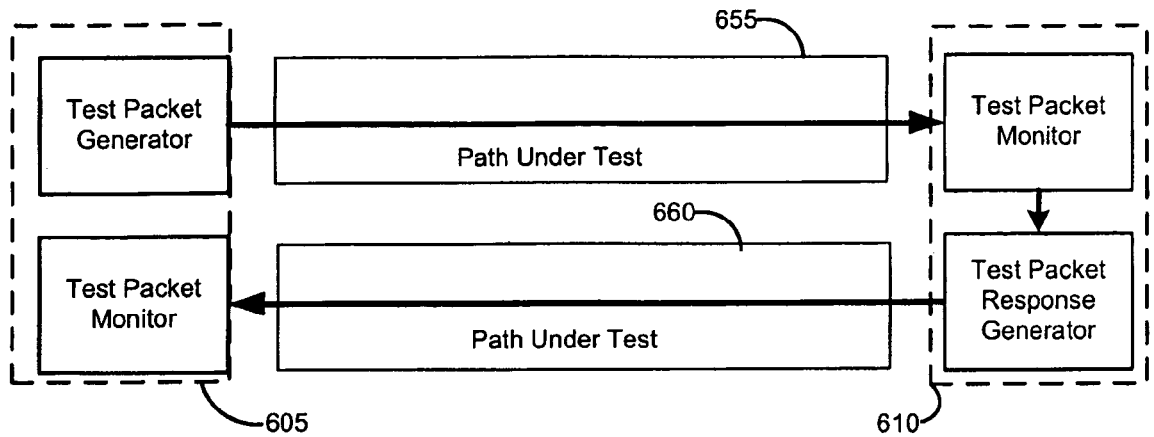

In FIG. 6C, an exemplary block diagram 600C illustrates how both cases may be combined when forward and backward paths are under test. For example, this may be the circumstance if monitoring is for a bi-directional Service Level Agreement (SLA). In such a case, the traffic generated by the remote Device 610 may contain the forward traffic 655 statistics report (i.e., statistics on the path 655 from the local Device 605 to the remote Device 610), while generating test traffic for the reverse path 660.

Figure 6D:
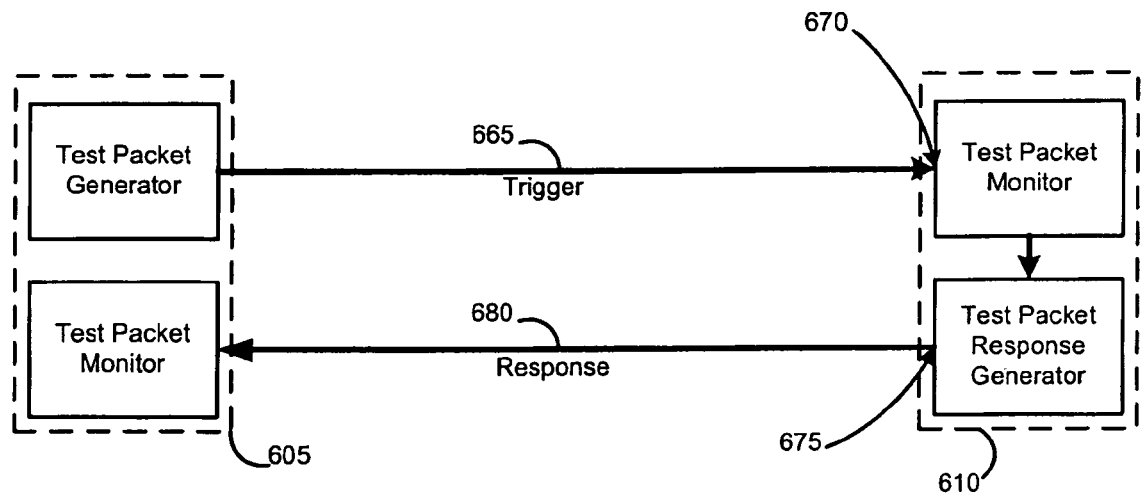

In FIG. 6D, an exemplary block diagram 600D illustrates so-called flow under test monitoring, which may be useful to determine the service level provided for a selected flow and determine the contribution of each device on the path for service level statistics. Each device under test on the flow path may support flow monitoring and report generation to an initiating Device 605. In the exemplary embodiment, the Test Packet Monitor of the Device 610 under test on the traffic path is triggered 665 to gather flow statistics at device ingress 670, such as jitter, and throughput. At egress 675 of the Device 610, similar flow statistics may be accumulated. Both series of measurements may provide contribution to flow statistics for the Device 610. The information may then be sent 680 to the initiating device 605 in the form of a response. Additionally, there may be any number of devices tested along a path, each contributing to flow statistics. Alternatively, a sole node could be tested. Timestamps may be applied upon ingress, at the Test Packet Monitor, at the Packet Generator, at device egress, or at an intermediate location or set of locations.

B. Capabilities: There is a range of functionality that may be undertaken by a Test Packet Monitor, as that term is used herein. The following cited functions are exemplary in nature:

Service Level Measure: A service level measurement, for example, may be done on received packet extracted information, the packet receive timestamp and the accumulated channel information. In some embodiments, the received packet sequence number is compared with previous maximal sequence number. The Test Packet Monitor 165 considers the packet "valid" when sequence number falls in a predefined range. If the sequence misorder is outside of the range, the CPU may be alerted. In some instances, the total number of lost and missordered packets is less relevant, and the loss rate and misorder rate are of importance. An alert rate timer may be configured in such instances.

Transit Time: In some exemplary embodiments, each channel may be configured to measure the Round Trip Time (RTT), or the One-way Transmit Time (OTT). The RTT is measured by reply arrival time minus the send time on the same station. The Timestamp in this case is relative to the same time base. The OTT is measured by reply Receiver recorded timestamp minus the Sender timestamp. These timestamps may be derived from different devices' time bases.

Jitter: In certain embodiments, jitter may be measured as an estimate of the statistical variance of the data packet interarrival time, measured in timestamp units and expressed as an unsigned integer. In some embodiments, the interarrival jitter is defined to be the mean deviation (smoothed absolute value) of the difference in packet spacing at the receiver compared to the sender for a pair of packets. This is equivalent to the difference in the "relative transit time" for the two packets. The relative transit time is the difference between a packet's timestamp and the receiver's clock at the time of arrival, measured in the same units.

In addition to the exemplary measurements listed above, numerous other measurements are possible with various embodiments of the present invention (e.g., measuring packet loss with sequence numbers). Such measurements will be apparent to those skilled in the art, and need not be discussed further here.

IV. Exemplary Embodiments

Figure 7A:
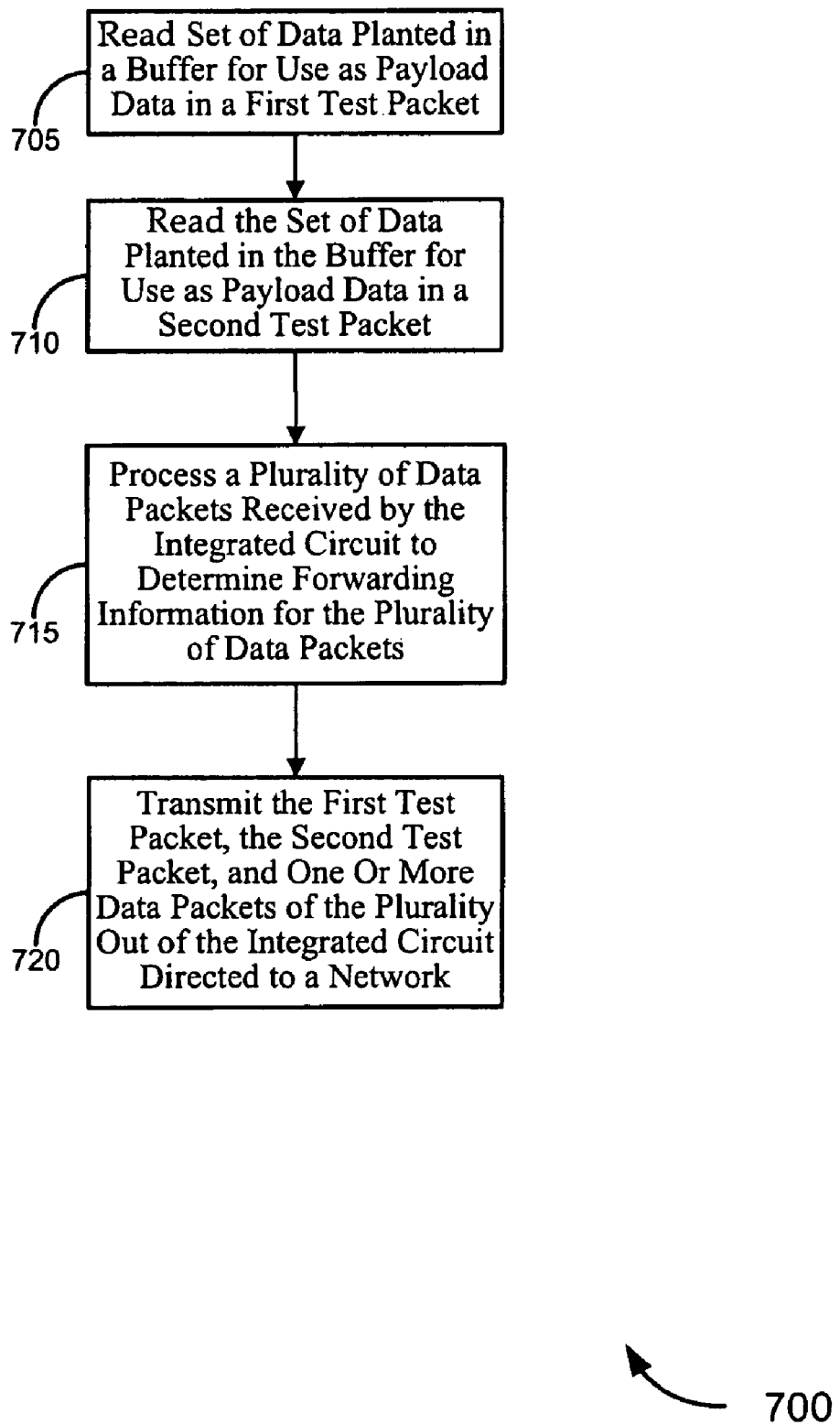
FIG. 7A is a flowchart illustrating the packet generation functionality according to various embodiments of the present invention.

A. Test Packet Generation: FIG. 7A sets forth an exemplary embodiment 700 of the invention, illustrating an exemplary hardware based method of generating a test packet from a single integrated circuit. At block 705, a set of data is read from a buffer for use as payload data in a first test packet. At block 710, the set of data is read from the buffer for use as payload data in a second test packet. At block 715, a plurality of other data packets received by the integrated circuit are processed to determine their forwarding information. At block 720, the first test packet, the second test packet, and one or more of the data packets are transmitted out of the integrated circuit.

Figure 7B:
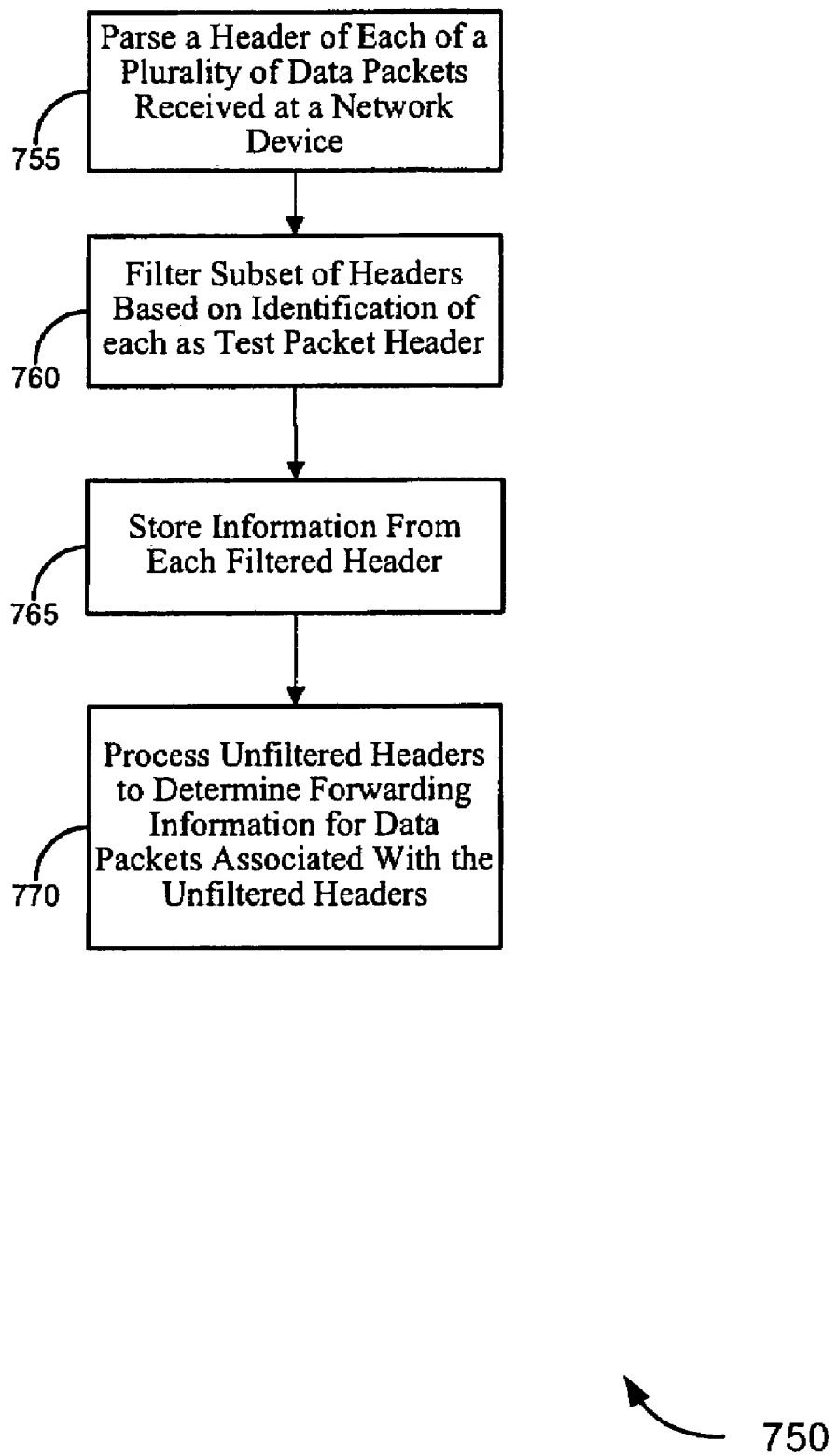
FIG. 7B is a flowchart illustrating the packet monitoring functionality according to various embodiments of the present invention.

FIG. 7B sets forth another embodiment 750 of the invention, illustrating an exemplary hardware based method of monitoring test packets from a single integrated circuit. At block 755, a header of each of a plurality of data packets received at a network device is parsed. At block 760, a subset of the headers are filtered, based on their identification as test packet headers. At block 765, information from each filtered header is stored. At block 770, unfiltered headers are processed to determine forwarding information for data packets associated with the unfiltered headers.

Figure 8:
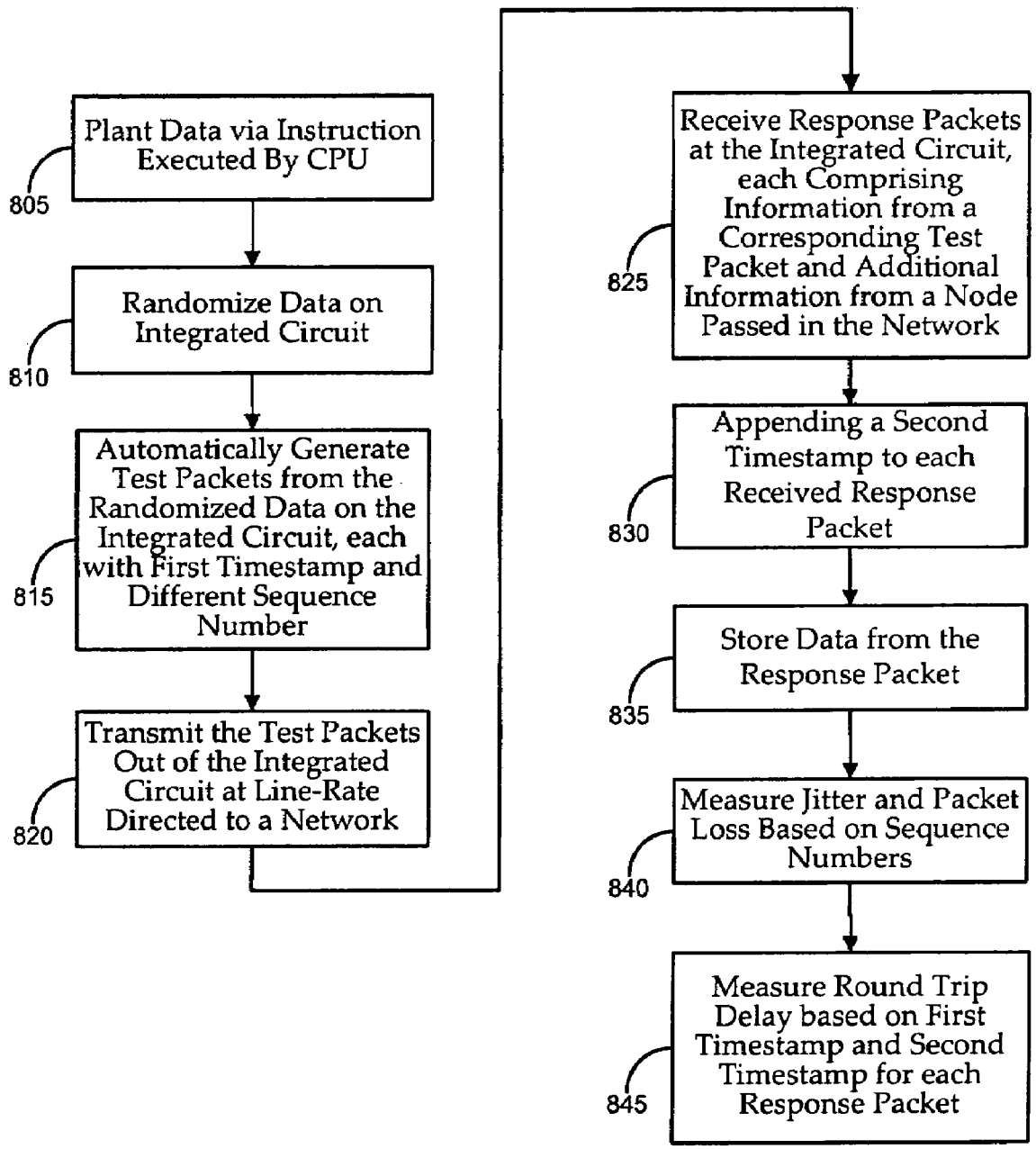
FIG. 8 is a flowchart illustrating an alternative aspect of the packet generation functionality according to various embodiments of the present invention.

FIG. 8 sets forth another exemplary embodiment 800 of the invention, illustrating an alternative method of hardware based test packet generation from a single integrated circuit. At block 805, data may be planted via instructions executed by a CPU coupled with the integrated circuit. This data may, for example, be planted in an allocated buffer, which may then be read one or more times for use as payload in a test or response packet. The data read from the buffer is randomized at block 810. At block 815, test packets are automatically generated using the randomized data as payload, each test packet including a different timestamp and different sequence number. The generated test packets are, at block 820, then transmitted out of the integrated circuit at line-rate and targeted at a network.

At block 825, response packets are received the integrated circuit. Each response packet comprises a response sent based on the corresponding test packet transmitted at block 820. Each response packet includes information from its corresponding test packet and additional information from a network node. At block 830, a second timestamp is appended to each received response packet. At block 835, data from the response packet is stored. In some embodiments, this storage may occur on the integrated circuit. At block 840, jitter and packet loss are measured based on order of the sequence numbers associated with the response packets. At block 845, round trip time is measured based on the first timestamp and second timestamp for each response packet.

Figure 9:
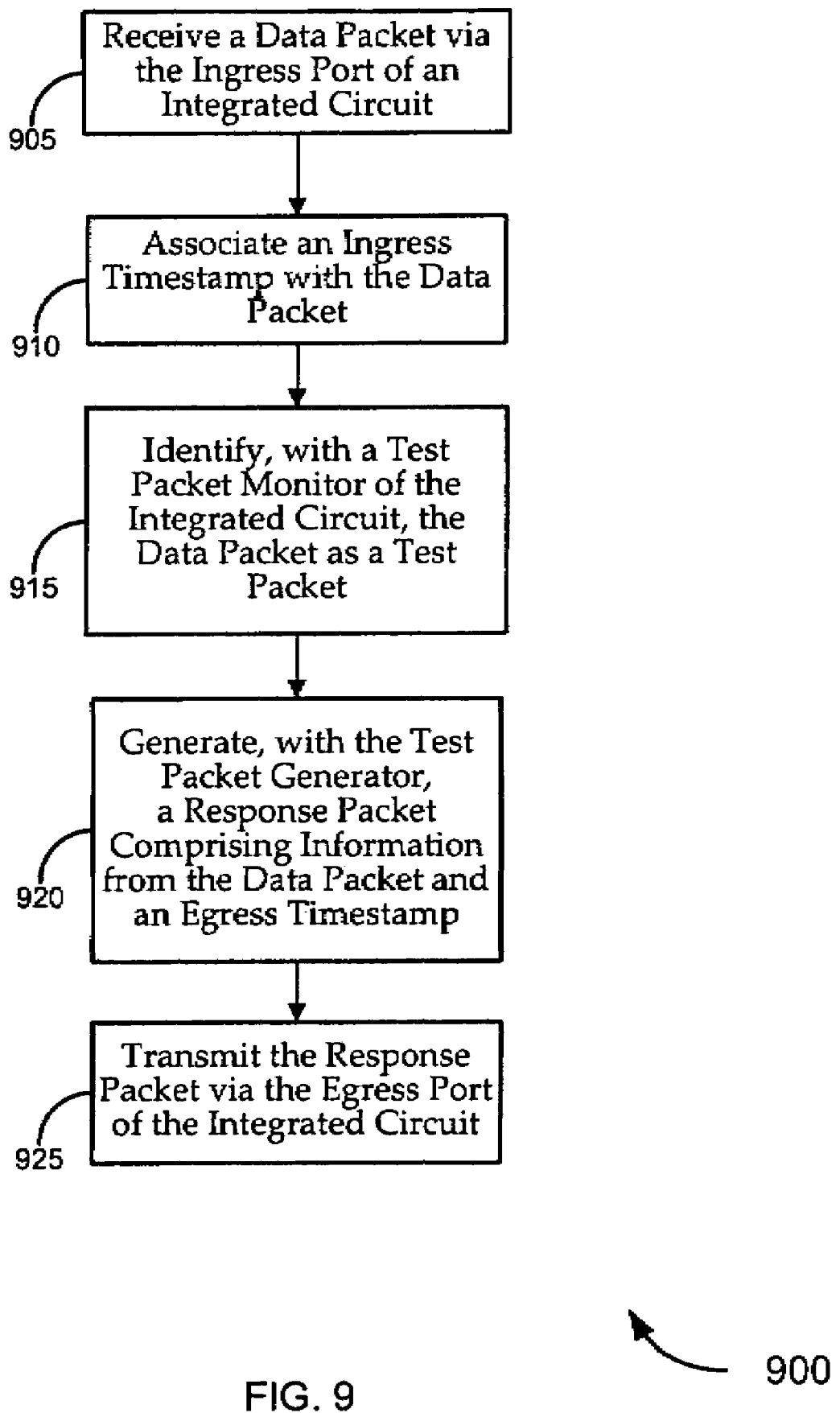
FIG. 9 is a flowchart illustrating the packet reception and response functionality according to various embodiments of the present invention.

B. Response Packet Generation: FIG. 9 sets forth an exemplary embodiment 900 of the invention, illustrating an exemplary hardware based method of receiving a test packet and generating a response from a single integrated circuit. At block 905, a data packet is received via the ingress port of an integrated circuit. At block 910, an ingress timestamp is associated with the data packet. At block 915, a test packet monitor of the integrated circuit identifies the data packet as a test packet. At block 920, a test packet generator of the integrated circuit generates a response packet made up of information from the data packet and an egress timestamp. At block 925, the response packet is transmitted via the egress port of the integrated circuit.

Figure 10:
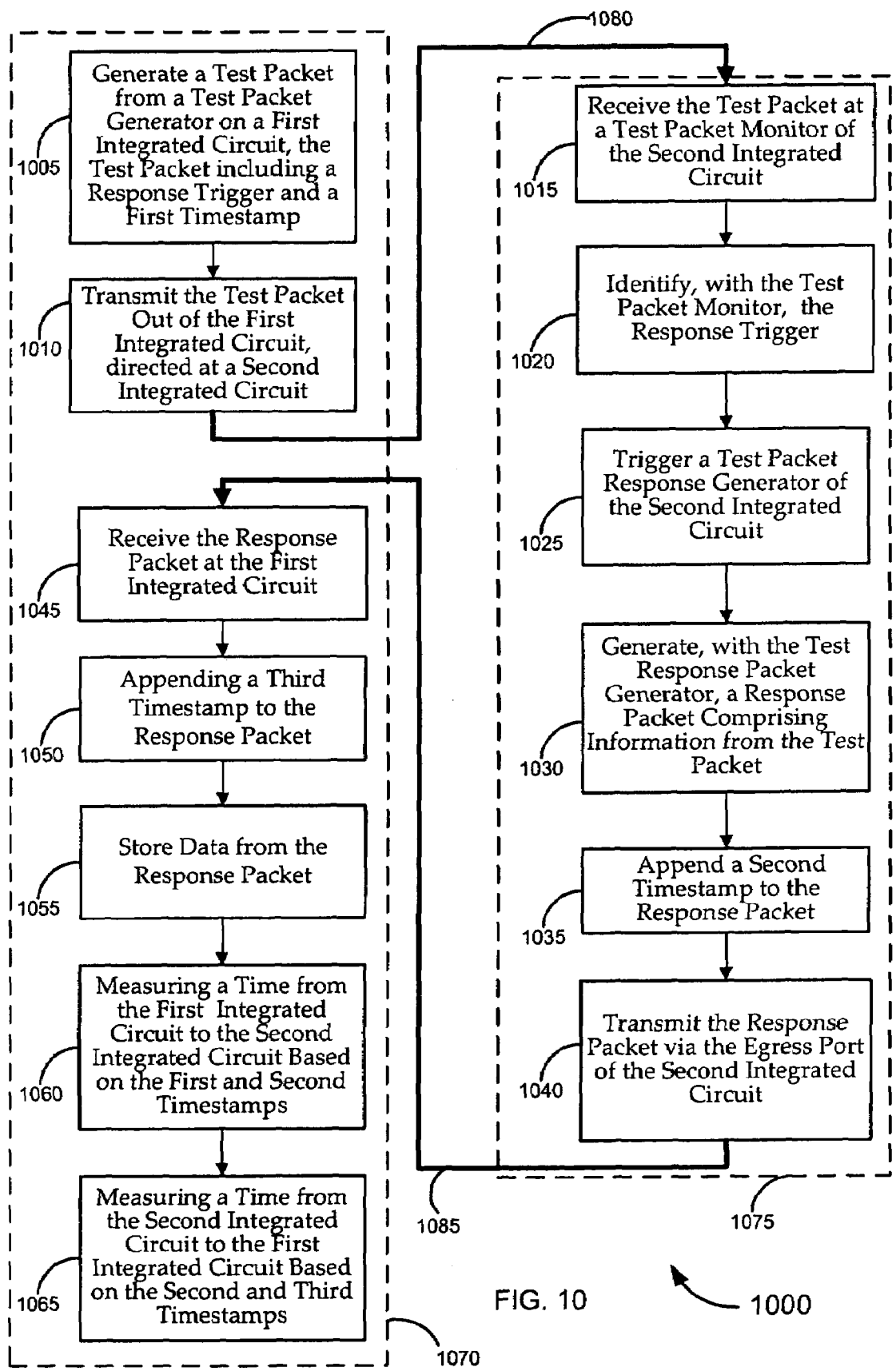
FIG. 10 is a flowchart illustrating a system of test packet generation and monitoring according to various embodiments of the present invention.

C. System: FIG. 10 sets forth an exemplary embodiment 1000 of the invention, illustrating an hardware based method of test packet generation and response between two integrated circuits. At block 1005, a test packet is generated from a test packet generator on a first integrated circuit, the test packet including a response trigger and a first timestamp. At block 1010, the test packet is transmitted out of the first integrated circuit, directed at a second integrated circuit.

At block 1015, the test packet is received at a test packet monitor of the second integrated circuit. The test packet monitor identifies, at block 1020, the response trigger in the test packet. At block 1025, the trigger identification initiates the test packet response generator of the second integrated circuit. At block 1030, the test packet response generator generates a response packet comprising information from the test packet. At block 1035, a second timestamp is appended to the response packet, in any manner known in the art. At block 1040, the response packet is transmitted through the egress port of the second integrated circuit.

Back at the first integrated circuit, the response packet is received at block 1045, and a third timestamp is appended to the response packet at block 1050. At block 1055, data from the response packet is stored. At block 1060, a time for the path from the first integrated circuit to the second integrated circuit based on the first and second timestamps is measured. At block 1065, a time for the path from the second integrated circuit to the first integrated circuit is measured based on the second and third timestamps. The dashed area represented by reference numeral 1070 represents the action undertaken by the first integrated circuit, while the dashed area represented by reference numeral 1075 represents the action undertaken by the second integrated circuit. Each integrated circuit is, therefore, an embodiment of the invention. These separate embodiments may communicate as shown by the communication flow indicated by reference numerals 1080 and 1085 and, thus, together they comprise a system embodiment.

V. Conclusion

It should be noted that the methods, systems and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow chart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

Furthermore, while some embodiments may be implemented in hardware, others may be implemented in software, firmware, middleware, microcode, hardware description languages, or any combination thereof. When implemented in software, firmware, middleware or microcode, the program code or code segments to perform the necessary tasks, as well as other data stored in memory, may be stored in one or more machine readable media such as a storage medium. Such machine readable media may include read only memory (ROM), random access memory (RAM), magnetic RAM, core memory, magnetic disk storage mediums, optical storage mediums, flash memory devices or other machine readable mediums for storing information. The media may be located in a device including, but is not limited to, portable or fixed storage devices, storage media, optical storage devices, a sim card, other smart cards, and various other mediums capable of storing, containing or carrying instructions or data. One or more processor cores may perform the necessary tasks. Also note that while many functions may be accomplished independent from the CPU, they may in some embodiments also be accomplished via instructions executed by the CPU. The description, therefore, should not be taken as limiting the scope of the invention, which is defined in the following claims.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before, or after, the above elements are considered. In addition, reference is made to different functions performed by different units or engine, such as planting, reading, generating, processing, and transmitting, being performed by corresponding units in the ingress and egress pipelines. These functions could be performed in any other separate processing units, or some or all could be performed in a single processing unit differently configured by program instructions for each function. Accordingly, the above description should not be taken as limiting the scope of the invention, which is defined in the following claims.

What is claimed is:

1. A method of receiving a test packet at a network device from a node on a network, the method comprising:
   parsing a header of each of a plurality of data packets received at the network device;
   filtering a subset of the parsed headers based on identification of each as a test packet header, the filtering resulting in filtered parsed headers and unfiltered parsed headers;
   storing information including a sender timestamp assigned by the node on the network from each filtered parsed header; and
   processing unfiltered parsed headers to determine forwarding information for data packets associated with the unfiltered parsed headers.

2. The method of claim 1, further comprising:
   releasing buffers allocated to the test packet and storing payload data from each filtered parsed header.

3. The method of claim 1, further comprising:
   transmitting the test packet from the network device directed at the network,
   wherein one or more of the filtered parsed headers comprise headers of response packets triggered by the test packet at a node in the network.

4. The method of claim 1, further comprising:
   generating a response packet triggered by one or more filtered parsed headers.

5. The method of claim 1, further comprising:
   generating a plurality of response packets based on a filtered parsed header, the generating step triggered by the identification of the filtered parsed header as a test packet header.

6. The method of claim 5, wherein each test packet of the plurality of data packets comprises a different timestamp and a different sequence number.

7. The method of claim 1, further comprising:
   associating the sender timestamp with a filtered parsed header after entry to the network device; and
   appending an egress timestamp to a responsive test packet triggered by the filtered parsed header, wherein the responsive test packet includes information comprising the first timestamp.

8. The method of claim 1, further comprising:
   monitoring a communication path associated with one or more of the filtered parsed headers; and
   sending failure notification when information stored from one or more of the filtered parsed headers indicates failure on the communication path.

9. An apparatus for test packet monitoring from a single integrated circuit configured to forward traffic on a network, the apparatus comprising:
   an ingress port configured to receive a plurality of data packets;
   a test packet monitor coupled with the ingress port, the test packet monitor configured to filter a subset of the plurality of data packets based on an identification as test packets;
   a forwarding engine coupled with the ingress port and an egress port, and configured to process unfiltered data packets to determine forwarding information for the unfiltered data packets;
   a control unit configured to store information including a sender timestamp assigned by a node on the network from each of the filtered data packets; and
   a transmit unit configured to transmit one or more unfiltered data packets of the plurality through the egress port.

10. The apparatus of claim 9, further comprising:
    a memory access unit configured to release buffers storing payload data from each of the filtered data packets.

11. The apparatus of claim 9, wherein,
    the transmit unit is configured to transmit a test packet through the egress port directed at the network; and
    one or more of the filtered data packets comprise response packets triggered by the test packet at a node in the network.

12. The apparatus of claim 9, further comprising a test packet generator coupled with the test packet monitor and the egress port, the test packet generator configured to generate a response packet triggered by one or more of the filtered data packets.

13. The apparatus of claim 9 further comprising a test packet generator coupled with the test packet monitor and the egress port, the test packet generator configured to generate a plurality of responsive test packets triggered by the identification of the filtered data packets as test packets.

14. The apparatus of claim 13, wherein,
    each response packet of the plurality comprises a different timestamp and different sequence number.

15. The apparatus of claim 9, wherein,
    the control unit is further configured to:
      associate the sender timestamp with a filtered data packet after entry to the network device; and
      append an egress timestamp to a response packet triggered by the filtered data packet, wherein the response packet includes information comprising the first timestamp.

16. The apparatus of claim 9, wherein the test packet monitor is further configured to notify a Central Processing Unit (CPU) coupled with the apparatus if a filtered data packet indicates failure on a monitored communication path.

* * * * *